United States Patent
Netto et al.

(10) Patent No.: US 11,250,086 B2
(45) Date of Patent: *Feb. 15, 2022

(54) VISUALIZATION AND AUGMENTATION OF HUMAN KNOWLEDGE CONSTRUCTION DURING MATERIAL CONSUMPTION

(71) Applicant: International Business Machines Corporation, Armonk, NY (US)

(72) Inventors: Marco A. S. Netto, Sao Paulo (BR); Vagner F. D. Santana, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 59 days.

This patent is subject to a terminal disclaimer.

(21) Appl. No.: 16/752,801

(22) Filed: Jan. 27, 2020

(65) Prior Publication Data

US 2020/0159800 A1 May 21, 2020

Related U.S. Application Data

(63) Continuation of application No. 15/427,715, filed on Feb. 8, 2017, now Pat. No. 10,579,689.

(51) Int. Cl.
| | |
|---|---|
| *G06F 16/9535* | (2019.01) |
| *G06F 16/248* | (2019.01) |
| *G06F 16/2457* | (2019.01) |
| *G06F 40/106* | (2020.01) |
| *G06F 40/169* | (2020.01) |

(52) U.S. Cl.
CPC ........ *G06F 16/9535* (2019.01); *G06F 16/248* (2019.01); *G06F 16/24578* (2019.01); *G06F 40/106* (2020.01); *G06F 40/169* (2020.01)

(58) Field of Classification Search
None
See application file for complete search history.

(56) References Cited

U.S. PATENT DOCUMENTS

| | | | |
|---|---|---|---|
| 7,296,005 B2 * | 11/2007 | Minamino | ............ G10L 15/144 706/15 |
| 8,856,153 B2 | 10/2014 | Jain et al. | |
| 9,189,742 B2 | 11/2015 | London | |
| 9,817,893 B2 * | 11/2017 | Jaidka | ..................... H04L 51/32 |
| 2009/0119584 A1 | 5/2009 | Herbst | |
| 2011/0087956 A1 | 4/2011 | Sherman et al. | |

(Continued)

FOREIGN PATENT DOCUMENTS

| | | | |
|---|---|---|---|
| CA | 2451737 A1 | 6/2005 | |
| CN | 101872561 A | 10/2010 | |

(Continued)

OTHER PUBLICATIONS

List of IBM Patents or Patent Applications Treated as Related, dated Jan. 27, 2020, 2 pages.

*Primary Examiner* — Kim T Nguyen
(74) *Attorney, Agent, or Firm* — Scully, Scott, Murphy & Presser, P.C.; Joseph Petrokaitis (57) ABSTRACT

Providing knowledge representation of material content being consumed by a user combines the user's current behavioral data and data from external sources such as internet web sites and social media network. Visual representations of entities and their relationships in the content being consumed by the user are created while the user is consuming content, and displayed via a graphical user interface.

20 Claims, 8 Drawing Sheets

(56) References Cited

U.S. PATENT DOCUMENTS

| | | |
|---|---|---|
| 2012/0005616 A1 | 1/2012 | Walsh et al. |
| 2012/0077180 A1 | 3/2012 | Sohmshetty et al. |
| 2013/0332593 A1* | 12/2013 | Patnaikuni ............ G06Q 30/02 709/224 |
| 2014/0351261 A1 | 11/2014 | Aswani et al. |
| 2015/0248416 A1* | 9/2015 | Johnson ............ G06F 16/24578 707/734 |
| 2016/0255037 A1 | 9/2016 | Spivack et al. |
| 2017/0132237 A1 | 5/2017 | Kuo et al. |
| 2017/0249389 A1 | 8/2017 | Brovinsky et al. |
| 2018/0033051 A1* | 2/2018 | Maynard ............ G06Q 30/0269 |
| 2018/0146253 A1* | 5/2018 | Louboutin ......... G06Q 30/0201 |
| 2018/0189378 A1* | 7/2018 | Barnea ................. G06F 40/186 |
| 2018/0191796 A1* | 7/2018 | Gandhi ............... H04L 41/0896 |
| 2018/0212931 A1* | 7/2018 | Zhou ................. G06Q 30/0609 |

FOREIGN PATENT DOCUMENTS

| | | |
|---|---|---|
| CN | 103488724 A | 1/2014 |
| CN | 104462506 A | 3/2015 |
| EP | 2472494 A1 | 7/2012 |
| WO | 2014144931 A2 | 9/2014 |
| WO | 2015175443 A1 | 11/2015 |

\* cited by examiner

VISUALIZATION AND AUGMENTATION OF HUMAN KNOWLEDGE CONSTRUCTION DURING MATERIAL CONSUMPTION

FIELD

The present application relates generally to computers and computer applications, and more particularly to computer-implemented visualization, graphical user interface and augmentation of knowledge construction during material consumption via devices.

BACKGROUND

Computer-implemented content analysis tools may generate a text outline and perform pattern matching translations on content. Due to multitude of available devices, multitasking and information load that human-beings are experiencing have become common place. However, in consuming a relatively long material such as books, for example, via electronic devices, it may be that a user or a reader may not recall all characters or entities, and their relationships, in the consumed material, for example, as the user consumes the material over time. Not remembering such information may occur for example, because of the speed of the reader and the other tasks the user is conducting at the same time, for example, conversations with others, listening to music, watching TV.

Inventors in the present disclosure have recognized that a computer-implemented knowledge construction device, methodology and visualization would be helpful in recalling the characters or entities appearing in the content as the user consumes the content, and enhance a user's knowledge construction experience, as the user consumes the content.

BRIEF SUMMARY

A method and system of generating and visualizing knowledge construction may be provided. The method may be executed by at least one processor. The method, in one aspect, may include detecting a user consuming content of a material via a device. The method may also include generating entities and relationships between the entities specified in the content of the material by analyzing the content while the user is consuming the content. The method may further include detecting at least via the device, a user's behavior during the consuming of the content of the material. The method may also include generating weights to assign to the entities and relationships and based on the user's behavior, updating the weights. The method may also include searching at least websites and social media databases to determine relevancy of the entities and relationships to the user. The method may further include, based on the relevancy, updating the weights. The method may also include generating a visualization that displays based on the weights, the entities as nodes and the relationships as edges between the nodes, the visualization changing over time based on the updating of the weights. The method may also include identifying a current point in the content the user is currently consuming. The method may further include generating in the visualization an icon that represents the current point. The method may also include displaying the visualization via a graphical user interface, the graphical user interface further presenting a timeline wherein the graphical user interface displays a state of the visualization corresponding to a time selected from the timeline.

A system of generating and visualizing knowledge construction, in one aspect, may include a device comprising at least a hardware processor, the device presenting content of a material, via which a user consumes the content of the material. The hardware processor may detect the user consuming the content of the material. The hardware processor may also generate entities and relationships between the entities specified in the content of the material by analyzing the content while the user is consuming the content. The hardware processor may further detect a user's behavior during the consuming of the content of the material. The hardware processor may also generate weights to assign to the entities and relationships and based on the user's behavior, updating the weights. The hardware processor may search at least websites and social media databases to determine relevancy of the entities and relationships to the user. Based on the relevancy, the hardware processor may update the weights. The hardware processor may monitor user's current point of consumption in the content of the material. The hardware processor may generate a visualization that displays based on the weights, the entities as nodes and the relationships as edges between the nodes, the visualization changing over time based on the updating of the weights. The hardware processor may identify a current point in the content the user is currently consuming and the hardware processor may further generate in the visualization an icon that represents the current point. A display screen may be coupled to the hardware processor and display the visualization via a graphical user interface. The graphical user interface may further present a timeline wherein the graphical user interface displays a state of the visualization corresponding to a time selected from the timeline. A knowledge base may store the entities and relationships, and associated weights associated with different times during the consumption of the material.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A computer-implemented method, system and techniques for knowledge construction of material being consumed and visual representation of constructed knowledge are disclosed. In one embodiment, knowledge representation may be provided over time of a material, for example, combined with external and behavioral data. Visual representations (e.g., mind map, knowledge graph, ontology) of characters (and other entities) and their relationships may be created of user knowledge gained while consuming materials. Examples of material may include but are not limited to books, television series and documentaries. In one aspect, visual representations emphasize entities and their relationships according to the reader's knowledge and profile. Visual representations portray current events of entities and their relationships published in social media networks, news, blogs, among other external sources of information, and illustrate user behavior in consuming the material. Continuous support for knowledge construction may be provided to aid in recalling knowledge.

Figure 1:
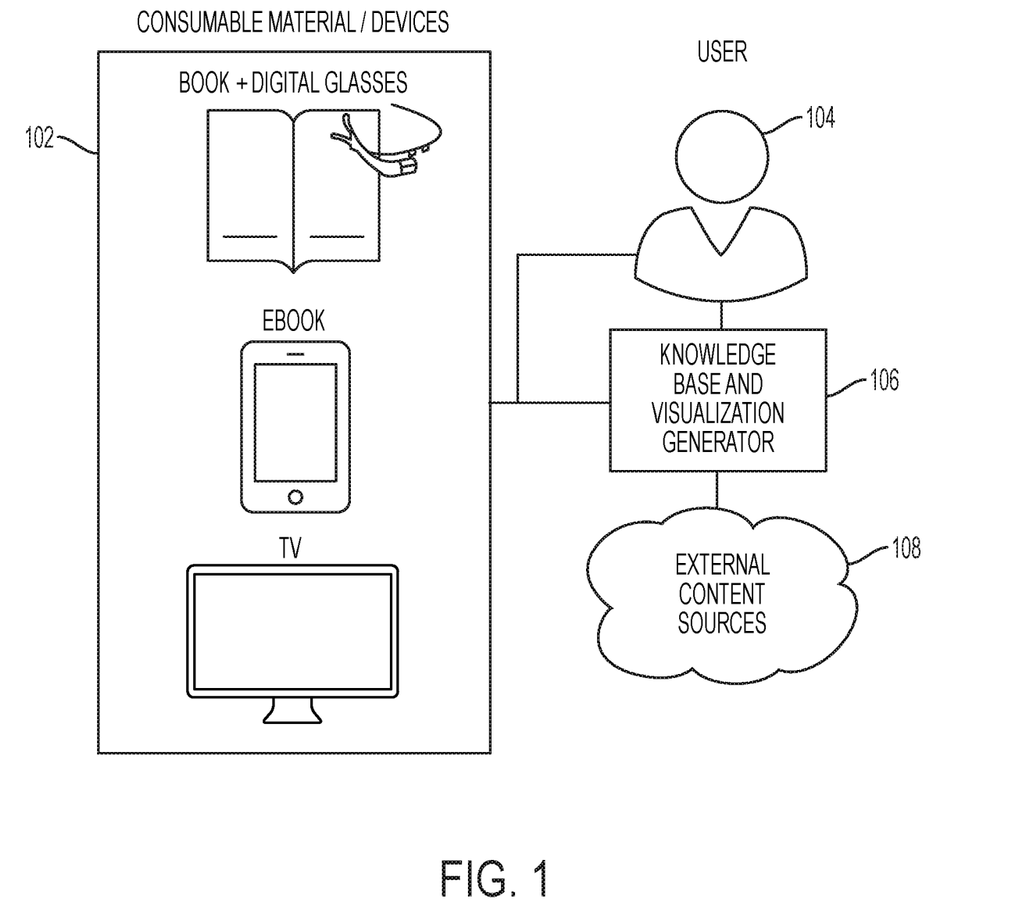
FIG. 1 is a diagram illustrating a system overview in one embodiment of the present disclosure.

FIG. 1 is a diagram illustrating a system overview in one embodiment of the present disclosure. Consumable material and devices 102 may include physical book with sensors such as cameras and/or digital glasses, electronic book (e-book) reader, TV for example showing series and/or documentaries. Device sensors such as a camera may monitor eye movement to detect focus item in consumed material and a timer may measure time spent on a task. A knowledge base and visualization generator 106, for example, monitors a user 104 consuming the material 102, and generates a knowledge base and visualization. A graphical user interface provides the output visualization that interconnects to web sites, social media, databases and other sources. The interconnection occurs via automatic web searches for additional material related to identified entities (e.g., as well as searches in corporate or educational databases the system has access to) in the material being consumed. Each additional material found related to the one identified entity is then attached to the knowledge representation used. The additional material may be of any media type, for instance, an image, a text extract, a Web page link, and/or a video link. The knowledge base and visualization generator 106 may connect to and access external content sources 108 such as social media networks and websites. Connections to external sources 108 may include connection to servers (e.g., social media, content web site such as news sources and others), corporate and/or education content database. The connections may change relative to the user actions, user's understanding (or not) of particular aspects of the material, determine what materials are relevant and dynamically changing in real time.

Figure 2:
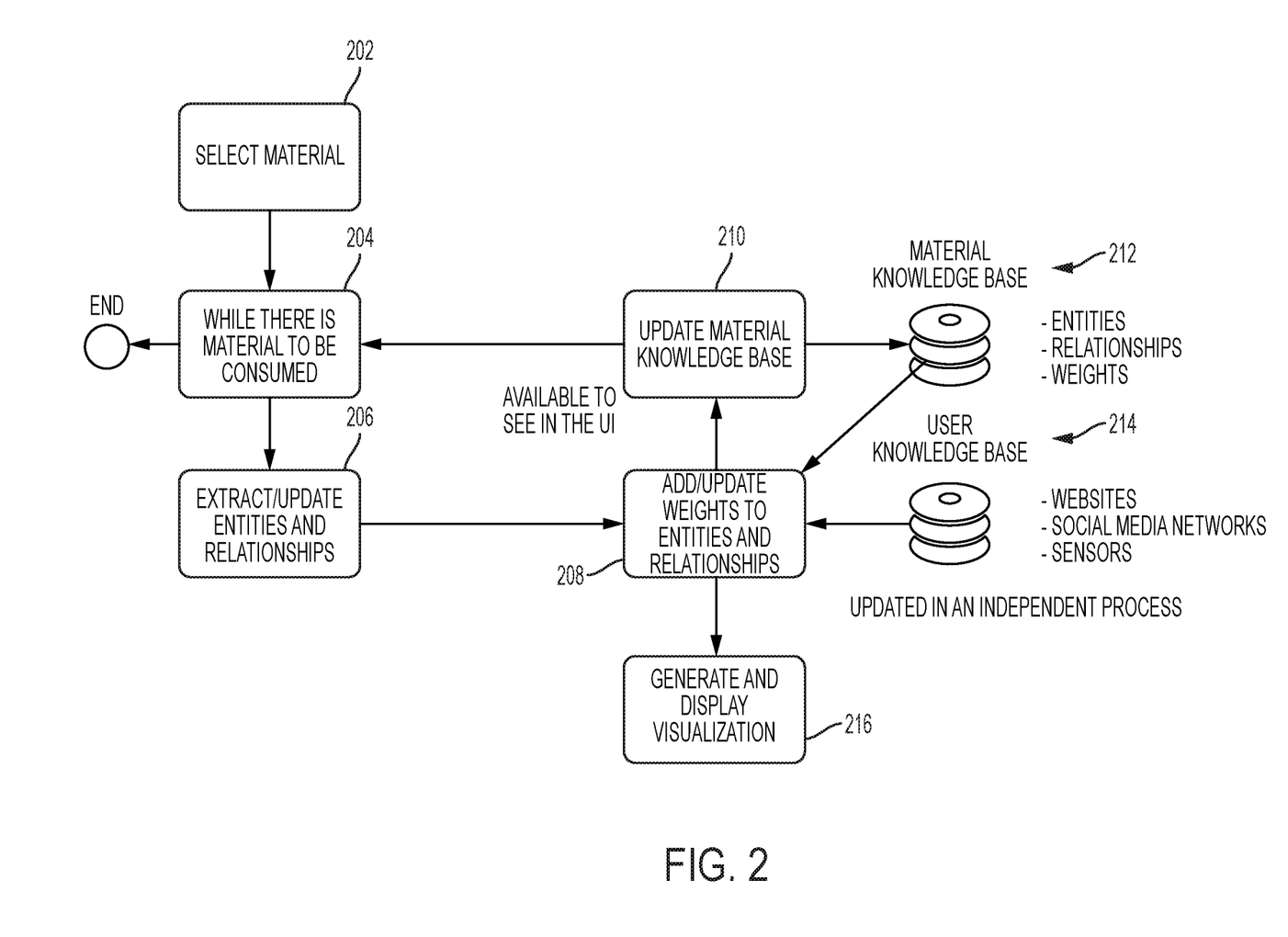
FIG. 2 is a diagram illustrating high level architecture of the system components and their interactions in one embodiment of the present disclosure.

FIG. 2 is a diagram illustrating high level architecture of the system components and their interactions in one embodiment of the present disclosure. The components shown are computer or hardware processor executable components. For example, a hardware processor may execute the processing shown at 202, 204, 206, 208, 210 and 216. The database shown at 212 and 214 may be stored in one or more storage devices and may be read, updated and written using one or more database or like software or computer executable program. At 202 user selected material to be consumed (e.g., a book on an e-book device) is received. At 204, user consuming the material is monitored continuously while the user is interacting with the system. The monitoring detects and outputs metrics related to speed in which the material is being consumed. Individualized metrics allow the system to identify when the user is consuming a material faster or slower than the mean speed. Examples of metrics include, but not limited to: number of pages read per day, hours or chapters watched.

While the user consumes the material, entities and relationships are extracted and updated at 206. Entities and relationships are extracted from the material, for example, using natural language processing, image processing, and/or video processing techniques. The processing of content in one embodiment considers unstructured data, for example, of the content. The frequency of the entities and relationships determine their relevance to be considered (e.g., characters that appeared only at a given or threshold frequency (for example, occurring at a frequency greater and equal to the threshold frequency) can be considered as a relevant entity). Such threshold frequency may be defined or configured. In one embodiment, the system of the present disclosure may include a user interface that offers or presents a slider bar on a display allowing the user to manipulate this threshold. For configured thresholds, the system may use a metric combining the number of nodes in the knowledge representation and a zoom feature that the user is applying to the visualization. e.g., with a higher zoom the system shows more details (low threshold to show entities and connections with low weight values) and, on the other hand, low zoom values shows less details (high threshold to show only entities and connections with high weight values). The zoom feature, which may influence the threshold configuration, allows the user to see more relevant entities and relationships. The higher the zoom, the more entities and relationships are presented to the user. The threshold may be configured based on the level of the zoom feature employed by the user. Entities and relationships may be extracted from the material, for example, using natural language processing. For instance, in the natural language processing (NLP) context, the system extracts all subjects, predicates, verbs, passive and active voice sentences in order to identify the entities and relationships among those entities. For instance, if there is an extract that reads, "The character A is B's father," the system extracts A and B as the entities and the "is father" relationship to characterize this connection. Moreover, as the material consumption continues, if this relationship is mentioned over and over along the material (a threshold number of times), the system increases the weight of this connection. In another embodiment, an ontology may be created that represents the knowledge via triplets, as in Resource Description Framework (RDF) documents, representing subject, predicate, and object.

At 208, weights are added or updated to the entities and relationships. For instance, every time a new entity or relationship is created, it assumes weight 1. Weights may be then incremented according to a given criterion. An example of a criterion may be the frequency of entity and relationship in the material. For example, if the entity occurs a given threshold number of times, the weight associated with the entity may be incremented, e.g., by 1. Similarly, if a relationship is identified that occurs a given number of times, the weight associated with the relationship may be incremented, e.g., by 1.

Another example of a criterion is the amount of user focus or attention, for example, if the user pays more attention to a part of the material about an entity or a relationship, the weight associated with that entity or relationship may be increased. The amount of user focus or attention may be determined by detecting user behavior via one or more sensor devices associated with a device presenting the material. For example, such sensor devices may detect whether a user's gaze directed on an item or a page of the material for a given period of time, whether the user rereads the page or area of the page. In addition to the use of additional sensors, it is also possible to detect the amount of time a user spent while consuming a material via interaction events (e.g., scrolling, mouse movements, selection of text, time viewing a part of the content, amount of scrolling and speed of scrolling performed while consuming a material).

Another example of a criterion may be a previous knowledge of the user about the entity or relationship. For example, if an entity is an actor a user reads frequently about, the weight may be increased. Such frequency may be quantified as a threshold value, which when exceeded, triggers the weight to be incremented, e.g., by a value such as 1. The previous knowledge of the user may be determined based on searching a user knowledge base 214, which may include websites, social media networks, sensors and/or others. User knowledge database 214 is built automatically based on content consumed and/or written by the user in websites, social media networks, and captured by sensors. User knowledge database 214 may be updated in an independent process. A system component with access to the web browser history, for instance, is capable of identifying content consumed by the user, which allows the weight to take into account content consumed in websites, social media networks, and others.

Yet another example of a criterion may include a current exposition of the entity and relationship in the media. For example, if an entity is an actor, who has just played a key role in a popular movie, the weight may be incremented. This type of information may be determined based on searching the user knowledgebase 214.

The system in one embodiment combines both the user knowledge base and material knowledge base, for example, the system determines entities and relationships based on the user interest and on the content being consumed. In another embodiment, the system may allow a user to select any combination and threshold for combining such knowledge bases.

At 210, a material knowledgebase 212 is updated with entities and/or relationships and the weights. The updates are visualized on a graphical user interface display. The entities and/or relationships may be stored in the material knowledgebase 212, for example, per user per material. Such entities and/or relationships data may have pre-existed or pre-stored in the material knowledgebase 212 and may be updated as a user is consuming a material. In another embodiment, if the user is consuming a particular material for the first time, the entities and/or relationships information (data) may be stored as the detection of user consuming material occurs. For instance, the information of material knowledge is stored in a database. The data structure of the information may include: entity names, time/date of creation of the entities, entity relationships, the time the relationships were created, and weights of the relationships. In one embodiment, for book materials as an example, additional information or marker may be included such as (i) chapter and paragraph within a chapter where an entity is created and (ii) chapter and paragraph within a chapter where a relationship is created. In addition, the material knowledge database may store time and date (chapter and paragraph within a chapter) when an entity and relationship had their weights updated, for example, as markers.

The material knowledge database 212 may store entity data, relationship data and weights. An entity can be a character or a relevant-to-the-story object (e.g., an item, software, or place). A relationship connects a pair of entities. A weight is a value that indicates the relevance (e.g., a number or factor) of the entity or relationship compared to other entities and relationships.

At 216, a graphical user interface displays one or more of the following visualization. The visualization is generated, for example, based on the determined entities, relationships, and weights, described above. An example of visualization may include raw graphs of entities and relationships. Another example of visualization may include weighted graphs of entities and relationships according to user knowledge and current content about entities and relationships consumed by the user in real-time. Yet another example of visualization may include weighted graphs of entities and relationships according to material consumption behavior, for example, user tends to skip or read fast, or pay little attention, while consuming material parts related to an entity and/or relationship. Still another example of visualization may include weighted graphs of entities and relationships according to relevant facts, for example, news, blogs, social media networks, related to an entity and/or relationship.

The weights play a role for allowing the user to manipulate multiple levels of details of the visualization, given that the number of entities and connections may increase depending on the complexity of the material consumed. Thresholds configured and/or defined by the user use the weights for defining what should be visible or what should be hidden. For example, entities and/or relationships that have weights that exceed an associated threshold are shown. Those that do not meet the threshold may not be shown in the visualization. In one embodiment, a threshold may be configured or defined per entity, entity type, relationship, or relationship type. In another embodiment, a general threshold may be defined for all entities and/or relationships.

The point in the material content the user is currently in may be tracked or identified and displayed, for example, real-time, on the visualization, for example, drawn on the map of entities and relationships. For example, one or more visual representation based on the identified point the user is currently in, is presented with the map of entities and relationships. For text material, an e-book reader or application may provide information of the current page the user is consuming, for example, which page the user is currently reading or consuming. A physical book consumed using digital glasses can also track the location or point in the book, where the user is consuming. For videos, video players can provide the information of the location of the material the user is consuming. The system of the present disclosure communicates to those devices, for example, e-book reader, digital glass and/or video player, tracking and determining the point or location of the user's current consumption in the material content.

The following scenario illustrates a use case for a methodology of the present disclosure in one embodiment. The methodology in this example assists in learning a biography. Consider that User M selects a book to read about the biography of Person J. In the beginning of the book several characters are introduced in the first two chapters of the book. In the following day, User M resumes the reading and notices that three of these characters start to play a key role in the story, however, User M does not remember their relationship described in the first two chapters. The methodology of the present disclosure allows User M to see the relationships of these three characters and how they are connected (e.g., via weights) compared to other relationships of other characters. User M is also be able to see that one of these characters is currently very exposed in the media, e.g., due to the new company such a character has recently created.

Figure 3A:
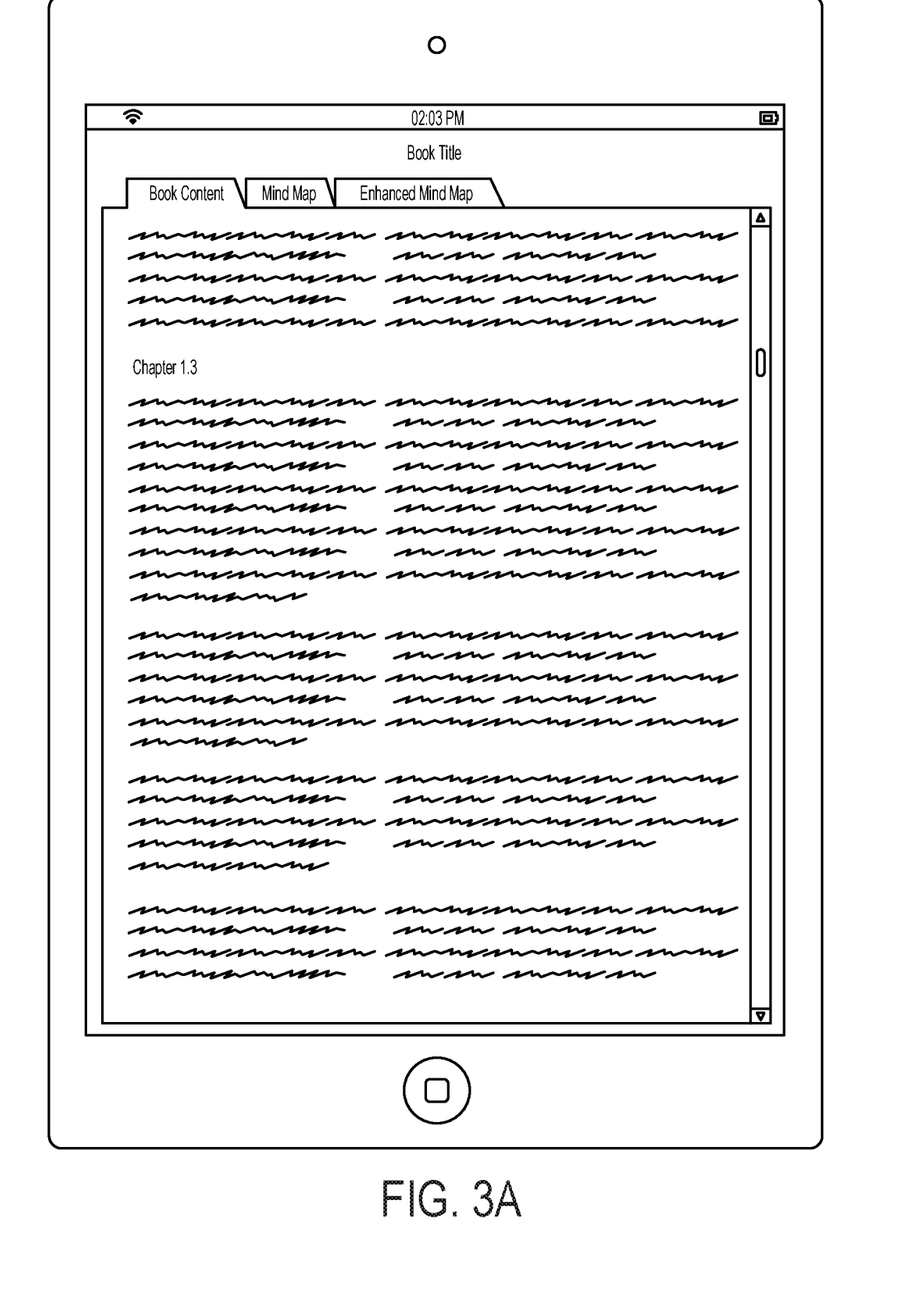
FIGS. 3A-3C illustrate screen shots of an example e-book displaying material content and knowledge construction in one embodiment of the present disclosure.
Figure 3B:
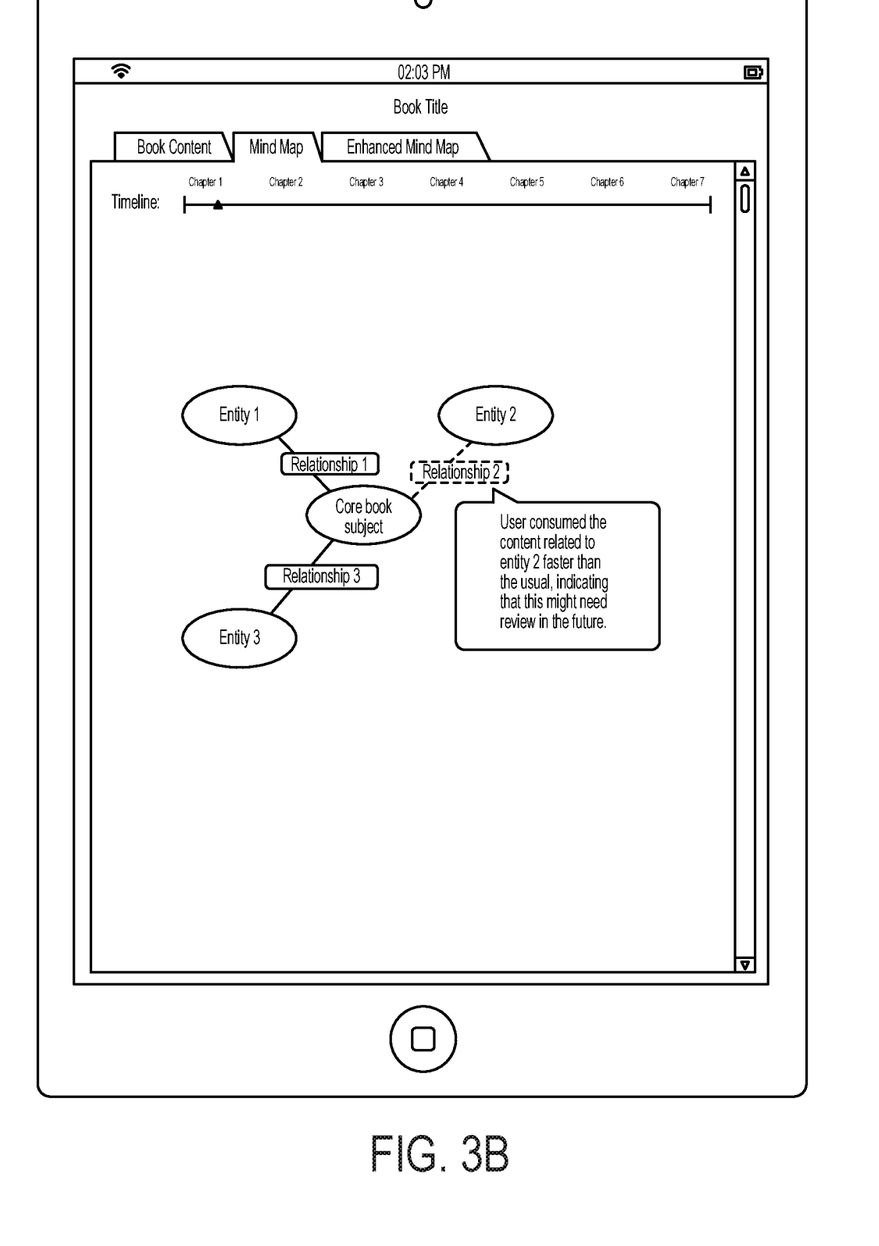
Figure 3C:
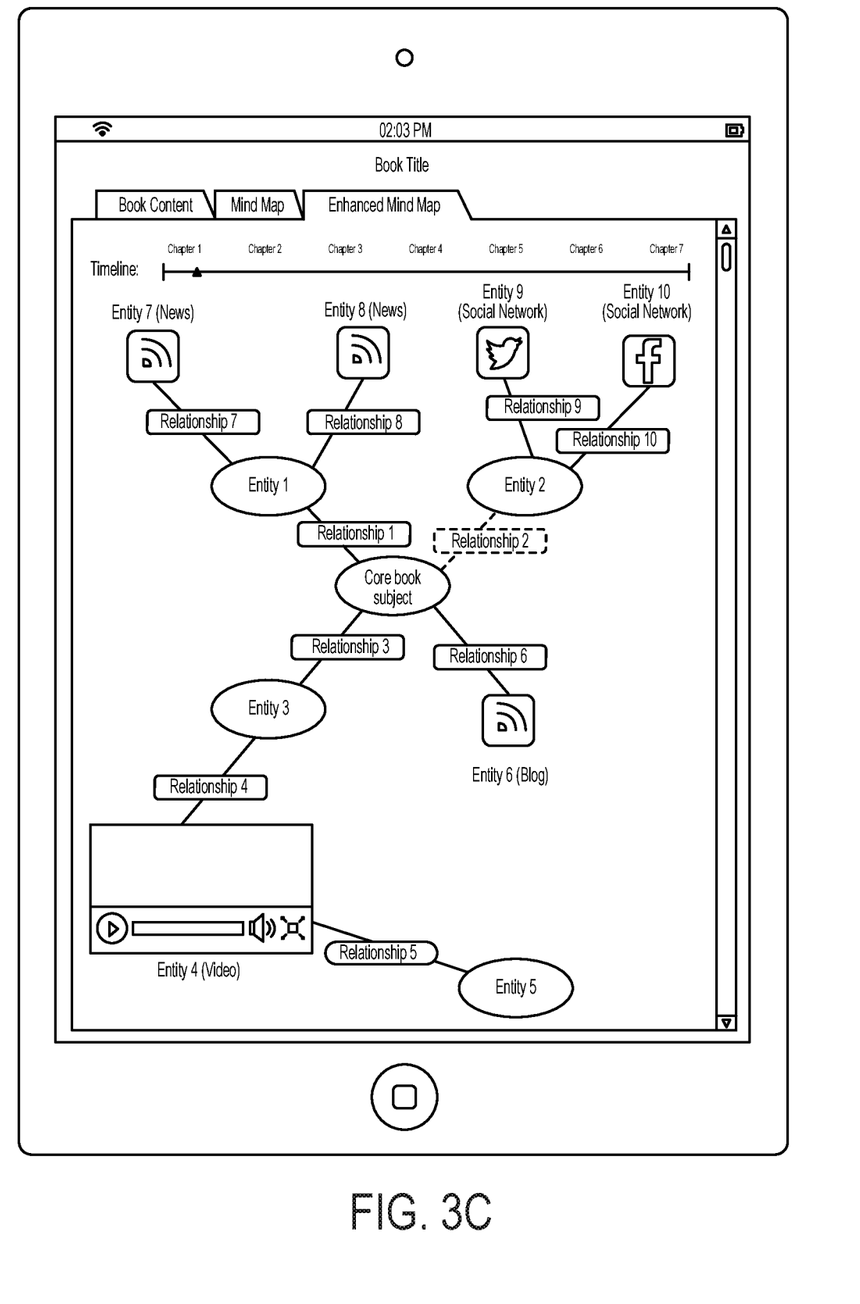

The methodology of the present disclosure may be embodied in an e-book, as an example. FIGS. 3A-3C illustrate screen shots of an example e-book displaying material content and knowledge construction in one embodiment of the present disclosure. FIG. 3A shows a book content on a page of an e-book. FIG. 3B shows visualization generated of a mind map while the user is consuming the page shown in FIG. 3A. FIG. 3C shows visualization generated of an enhanced mind map. The e-book, for example, may have tabulated screen pages and the enhanced mind map of the present disclosure may be shown on a different tab of the e-book, for example. Referring to FIG. 3C, the visualization shows an enhanced mind map combining the entities from the content accompanied by content found on social media, news, blogs, and video sharing websites. The visualization then connects entities from the book with content retrieved by the web searches performed considering the book entities as search terms. For example, as shown, entity 1, entity 2, entity 3 and entity 5 may be entities occurring in an e-book content, which are visualized in relationship with entity 4, entity 7, entity 8, entity 9 and entity 10, which are additional material found from searching web resources, for example.

In one embodiment in the system and method of the present disclosure, the visual knowledge representation (e.g., mind map, knowledge graph, ontology) of the material may be processed or accessed offline, counting on a time component that supports users on seeing the representation of the knowledge at a given time in the material. For example, a user can see or access the representation of the knowledge at any time of consuming the material. If the reader is about to finish a book, the user can check what the user's knowledge was about the material at the time the user was consuming the middle of the book. The navigation throughout this time component may be done by the user by manipulating the timeline (as shown in FIGS. 3B and 3C) on the graphical user interface.

In one embodiment, the timeline may be based on units of chapters as an example for material that is organized into chapters (e.g., a book). Thus, the representation of knowledge (e.g., nodes and edges and corresponding weights representing entities and relationships) may be generated and stored per chapter in a knowledge base, wherein the representation of knowledge associated with a chapter represents knowledge of the user at the time the user is consuming that chapter. Hence, representations of knowledge may be retrieved that corresponds to knowledge at a point in time in consuming of material. In one embodiment of the user interface implementation, a slider or scroll allows the user to select the chapter (e.g., for a book material, a chapter may represent a time unit in a time line), and based on the position of the slider or scroll, the system retrieves the representation of knowledge associated with that chapter from the database.

In one embodiment in the system and method of the present disclosure, the visual knowledge representation may be enhanced in at run time considering user knowledge regarding that relevant topic, interaction behavior, and external data such as social networks, news, blogs, and/or other external data.

In one embodiment in the system and method of the present disclosure, knowledge representation is given to the user, gathering multiple materials and allowing users to interact with the knowledge representation via a timeline component, allowing the user to see the expected knowledge constructed at a given time. The system in one embodiment is able to identify the part in the content that an entity, relationship, or weight was changed. With this timestamped information, the timeline manipulation may show or hide entities and/or relationships and/or change connections' weights. While a user consumes the material, information on entities, relationships, and weights are updated and the time/date information is updated in the material knowledge database. At the same time, the user also may consume content from other external sources. Whenever such a content is consumed and it is identified that it is related to a given entity or relationship in the material being consumed, a timestamp of such consumption is also stored in the user knowledge base. Therefore, when the user wants to interact with the timeline component (via sliders/scrolls in the user interface), the system will collect information related to the time defined by the user in the slider/scroll (which could be a chapter or a paragraph within a chapter of a book), and the timestamp the user consumed that material (material knowledge database) and the timestamp the user consumed some external content (user knowledge database) needs to be similar (within a difference of seconds or minutes for instance) to be showed in the User Interface as depicted in FIG. 3C.

In one embodiment, the visualization is generated and presented automatically, for example, based on detecting a user consuming a material via a device such as electronic book, digital glass and/or others. The visualization represents knowledge or content of a material, for example, for user consumption, or being consumed by a user. In one embodiment, visualization represents knowledge or content of a material over time. The user interface in one embodiment of the present disclosure visualizes knowledge over increments of time, and is able to play on the display of the user interface the knowledge representation over time. The entities and relationships representing content may change over time based on real-time data. For example, real-time data may include data discovered in web searches associated with an entity and/or relationship.

Figure 5:
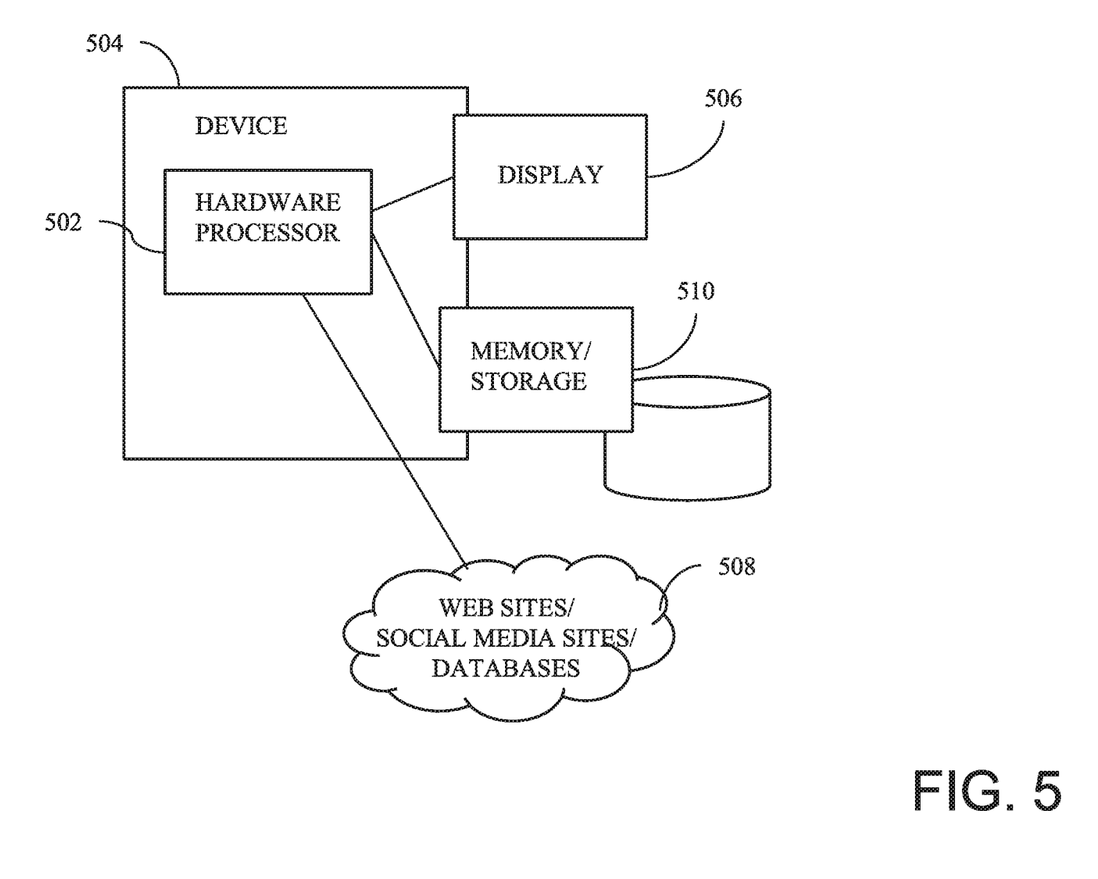
FIG. 5 is a system diagram showing system processing components in one embodiment of the present disclosure that generate and visualize knowledge construction.

FIG. 5 is a system diagram showing system processing components in one embodiment of the present disclosure that generate and visualize knowledge construction. A device 504 including a hardware processor 504 allows a user to consume content of material, for example, read the content contained in the material such as book, video, images. Examples of such a device may include, but are not limited to, an e-book reader or device, a digital glass, a smart television, and others. Such a device may present the content in a material being consumed to the user, for example, via a display screen 506. The hardware 502 processor detects the user consuming the content of the material. The hardware processor 502 generates entities and relationships between the entities specified in the content by analyzing the content while the user is consuming the content. The hardware processor 502 detects the user's behavior during the consuming of the content in the material. Based on the user's behavior, the hardware processor 502 generates weights to assign to the entities and relationships, and updates the weights. The hardware processor 502 searches at least websites and social media databases 508 to determine relevancy of the entities and relationships to the user. Based on the relevancy, the hardware processor 502 updates the weights. The hardware processor 502 monitors user's current point of consumption in the content of the material. The hardware processor 502 generates a visualization that displays based on the weights, the entities as nodes and the relationships as edges between the nodes, the visualization changing over time based on the updating of the weights. The hardware processor 502 may also identify a point in the content the user is currently consuming, and may generate in the visualization an icon that represents the current point. A display screen 506 may be coupled to the hardware processor 502 and display the visualization via a graphical user interface. The graphical user interface may present on the display screen 506 a timeline wherein the graphical user interface displays a state of the visualization corresponding to the time selected from the timeline. A knowledge base 510 stores the entities and relationships and associated weights associated over time.

Figure 6:
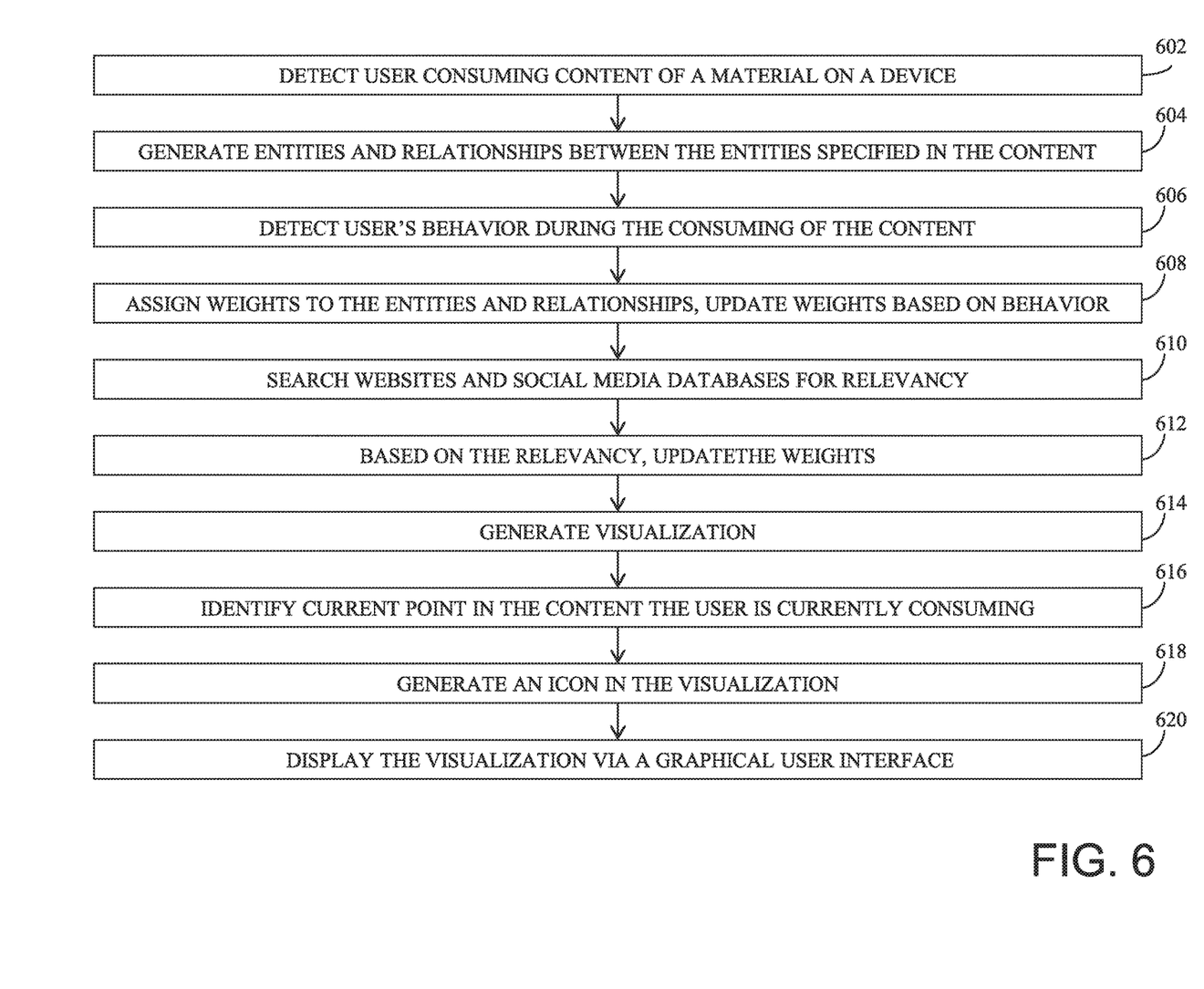
FIG. 6 is a flow diagram illustrating a method of generating and visualizing knowledge construction in one embodiment of the present disclosure.

FIG. 6 is a flow diagram illustrating a method of generating and visualizing knowledge construction in one embodiment of the present disclosure. At 602, a user consuming content of a material on a device is detected. At 604, entities and relationships between the entities specified in the content of the material are generated by analyzing the content while the user is consuming the content. At 606, for example, on the device, a user's behavior during the consuming of the content of the material is detected. At 608, weights to assign to the entities and relationships are generated and based on the user's behavior, the weights are updated. At 610, at least websites and social media databases are searched to determine relevancy of the entities and relationships to the user. At 612, based on the relevancy, the weights are updated. At 614, a visualization is generated that displays based on the weights, the entities as nodes and the relationships as edges between the nodes, the visualization changing over time based on the updating of the weights. At 616, a current point in the content the user is currently consuming may be identified. At 618, an icon may be generated in the visualization, the icon representing the current point. At 620, the visualization is displayed via a graphical user interface. The graphical user interface further presents a timeline. A user is allowed to select a time in the timeline. The graphical user interface displays a state of the visualization at the time selected from the timeline.

Figure 4:
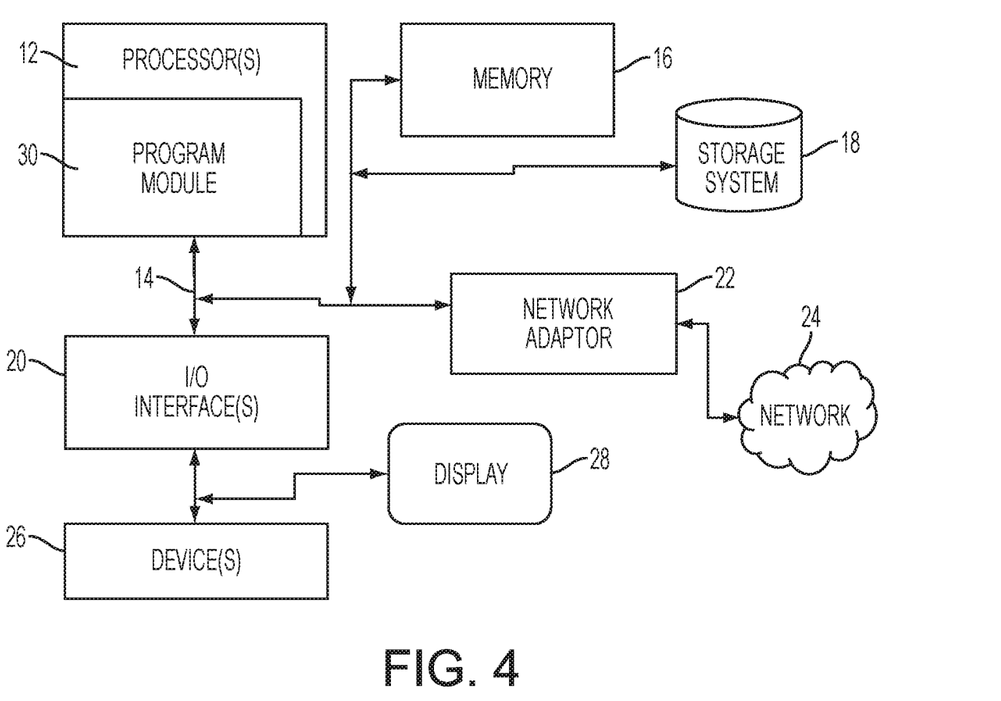
FIG. 4 illustrates a schematic of an example computer or processing system that may implement a visualization system in one embodiment of the present disclosure.

FIG. 4 illustrates a schematic of an example computer or processing system that may implement a visualization system in one embodiment of the present disclosure. An example of a processing system may be one embodied in a tablet or the like that displays an e-book. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A system comprising:
a hardware processor;
a memory device coupled with the hardware processor;
the hardware processor configured to at least:
analyze content of material presented to a user for user consumption;
generate entities and relationships between the entities specified in the content of material;
detect the user's behavior during the consuming of the content of the material, the detected user's behavior including at least speed at which the user is consuming the material;
generate weights to assign to the entities and relationships, and based on the user's behavior including at least the speed at which the user is consuming the material, updating the weights, the weights updated further based on the user's previous knowledge of the entities;
search at least websites and social media databases to determine relevancy of the entities and relationships to the user;
based on the relevancy, update the weights;
generate a visualization that displays based on the weights, the entities as nodes and the relationships as edges between the nodes, the visualization changing over time based on the updating of the weights,
wherein different states of the visualization based on different times selected can be visualized.

2. The system of claim 1, wherein the content of the material comprises at least one of text, image and a video.

3. The system of claim 1, wherein the hardware processor is coupled with at least one of a digital glass, an electronic-book device, and a smart television.

4. The system of claim 1, wherein the weights are incremented based on a frequency of occurrence of the entities and relationships in the content being consumed.

5. The system of claim 1, wherein the weights are incremented based on an amount of user attention paid to the entities and relationships detected based on the user's behavior.

6. The system of claim 1, wherein the weights are incremented based on the user's previous knowledge of the entities and relationships, the user's previous knowledge determined from the searching of the at least websites and social media databases.

7. The system of claim 1, wherein the weights are incremented based on a current exposition of the entities and relationship determined from the searching of the at least websites and social media databases.

8. A computer-implemented method comprising:
analyzing content of material presented to a user for user consumption;
generating entities and relationships between the entities specified in the content of material;
detecting the user's behavior during the consuming of the content of the material, the detected user's behavior including at least speed at which the user is consuming the material;
generating weights to assign to the entities and relationships and based on the user's behavior including at least the speed at which the user is consuming the material, updating the weights, the weights updated further based on the user's previous knowledge of the entities;
searching at least websites and social media databases to determine relevancy of the entities and relationships to the user;
based on the relevancy, updating the weights;
generating a visualization that displays based on the weights, the entities as nodes and the relationships as edges between the nodes, the visualization changing over time based on the updating of the weights,
wherein different states of the visualization based on different times selected can be visualized.

9. The method of claim 8, wherein the content of the material comprises at least one of text, image and a video.

10. The method of claim 8, wherein the method is performed using a device comprising at least one of a digital glass, an electronic-book device, and a smart television.

11. The method of claim 8, wherein the weights are incremented based on a frequency of occurrence of the entities and relationships in the content being consumed.

12. The method of claim 8, wherein the weights are incremented based on an amount of user attention paid to the entities and relationships detected based on the user's behavior.

13. The method of claim 8, wherein the weights are incremented based on the user's previous knowledge of the entities and relationships, the user's previous knowledge determined from the searching of the at least websites and social media databases.

14. The method of claim 8, wherein the weights are incremented based on a current exposition of the entities and relationship determined from the searching of the at least websites and social media databases.

15. A computer program product comprising a noontransitory computer readable storage medium having program instructions embodied therewith, the program instructions executable by a device to cause the device to:
analyze content of material presented to a user for user consumption;
generate entities and relationships between the entities specified in the content of material;
detect the user's behavior during the consuming of the content of the material, the detected user's behavior including at least speed at which the user is consuming the material;
generate weights to assign to the entities and relationships and based on the user's behavior including at least the speed at which the user is consuming the material, updating the weights, the weights updated further based on the user's previous knowledge of the entities;
search at least websites and social media databases to determine relevancy of the entities and relationships to the user;
based on the relevancy, update the weights;
generate a visualization that displays based on the weights, the entities as nodes and the relationships as edges between the nodes, the visualization changing over time based on the updating of the weights, wherein different states of the visualization based on different times selected can be visualized.

16. The computer program product of claim 15, wherein the content of the material comprises at least one of text, image and a video.

17. The computer program product of claim 15, wherein the device is associated with at least one of a digital glass, an electronic-book device, and a smart television.

18. The computer program product of claim 15, wherein the weights are incremented based on a frequency of occurrence of the entities and relationships in the content being consumed.

19. The computer program product of claim 15, wherein the weights are incremented based on an amount of user attention paid to the entities and relationships detected based on the user's behavior.

20. The computer program product of claim 15, wherein the weights are incremented based on the user's previous knowledge of the entities and relationships, the user's previous knowledge determined from the searching of the at least websites and social media databases, and wherein the further weights are adjusted based on a current exposition of the entities and relationship determined from the searching of the at least websites and social media databases.

* * * * *